(12) United States Patent
Dugganapally et al.

(10) Patent No.: US 8,874,726 B1
(45) Date of Patent: Oct. 28, 2014

(54) AUTOMATED LOAD BALANCING

(75) Inventors: Arun Dugganapally, Malden, MA (US); Stanley Luke, Stow, MA (US)

(73) Assignee: EMC Corporation, Hopkinton, MA (US)

( * ) Notice: Subject to any disclaimer, the term of this patent is extended or adjusted under 35 U.S.C. 154(b) by 402 days.

(21) Appl. No.: 12/803,592

(22) Filed: Jun. 30, 2010

(51) Int. Cl.
*G06F 15/173* (2006.01)

(52) U.S. Cl.
USPC ............ 709/224; 709/202; 709/203; 709/245

(58) Field of Classification Search
USPC .................................. 709/224, 202, 203, 245
See application file for complete search history.

(56) References Cited

U.S. PATENT DOCUMENTS

| | | | | |
|---|---|---|---|---|
| 6,052,724 | A * | 4/2000 | Willie et al. ................... | 709/223 |
| 7,107,419 | B1 * | 9/2006 | Ghemawat et al. ............ | 711/162 |
| 7,653,668 | B1 * | 1/2010 | Shelat et al. .................. | 707/610 |
| 2002/0066044 | A1 * | 5/2002 | Ikeda ............................. | 713/202 |
| 2007/0124380 | A1 * | 5/2007 | Carr et al. ...................... | 709/204 |
| 2009/0112789 | A1 | 4/2009 | Oliveira et al. | |
| 2009/0112921 | A1 | 4/2009 | Oliveira et al. | |
| 2011/0099420 | A1 * | 4/2011 | MacDonald McAlister et al. ............................. | 714/6.32 |
| 2011/0314465 | A1 * | 12/2011 | Smith et al. ....................... | 718/1 |

* cited by examiner

*Primary Examiner* — Lan-Dai T Truong
(74) *Attorney, Agent, or Firm* — Muirhead and Saturnelli, LLC

(57) ABSTRACT

Servicing an access request using a plurality of replicas of data includes determining which of the replicas are available and selecting one of the replicas for servicing the access request based on which of the replicas are available. At least one other replica is indicated as not available in response to receiving a monitoring message indicating that the at least one other replica is subject to degraded performance. The monitoring messages are independent of the access request. The monitoring messages may be SNMP messages. Servicing an access request using a plurality of replicas of data may also include determining if each of the SNMP messages affects the availability of the replicas. The replicas may be selected in round robin fashion or randomly.

20 Claims, 9 Drawing Sheets

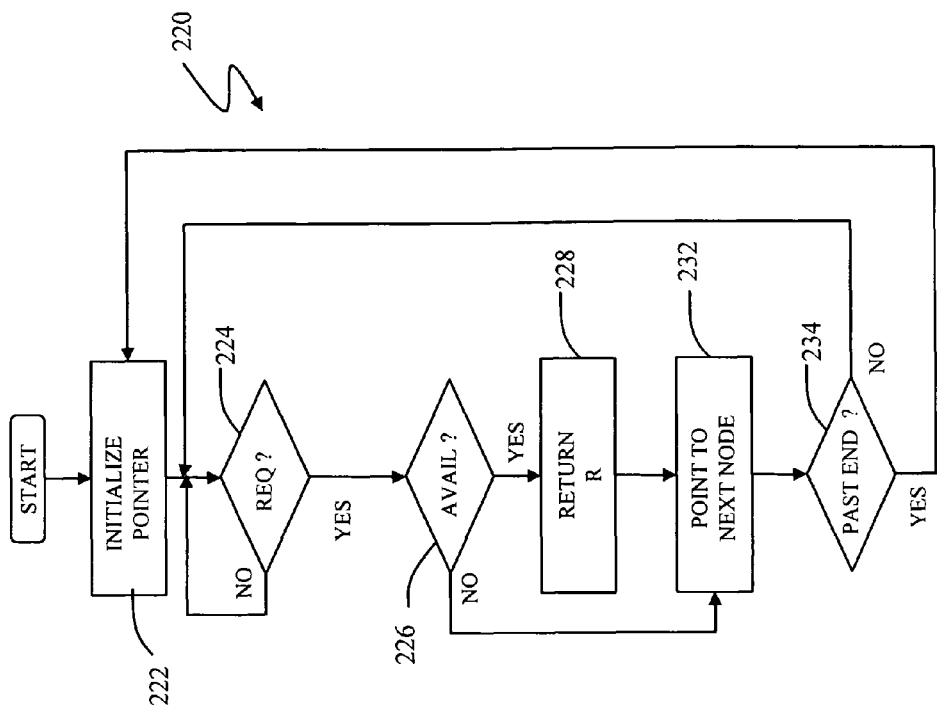
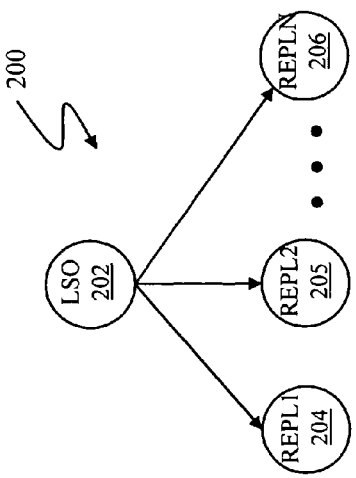
FIGURE 8
FIGURE 7

AUTOMATED LOAD BALANCING

BACKGROUND OF THE INVENTION

1. Technical Field

This application relates to the field of storing data, and more particularly to the field of storing and retrieving data in a large data storage system.

2. Description of Related Art

Information that is added annually to the digital universe is estimated to be around 988 billion gigabytes, which is about eighteen million times the information in all the books ever written. The type of information that is stored includes rich digital media and unstructured business content. There is also an ongoing conversion from analog to digital formats—film to digital image capture, analog to digital voice, and analog to digital TV. The rich digital media and unstructured business content have unique characteristics and storage requirements that are different from structured data types (e.g. database records).

Many conventional storage systems are highly optimized to deliver high performance I/O for small chunks of data. Furthermore, these systems were designed to support gigabyte and terabyte sized information stores. However, rich digital media and unstructured business content have greater capacity requirements (petabyte versus gigabyte/terabyte sized systems), less predictable growth and access patterns, large file sizes, billions and billions of objects, high throughput requirements, single writer, multiple reader access patterns, and a need for multi-platform accessibility. In some cases, conventional storage systems have met these needs in part by using specialized hardware platforms to achieve required levels of performance and reliability. Unfortunately, the use of specialized hardware results in higher customer prices and may not support volume economics as the capacity demands grow large.

Some of these issues have been addressed using cloud storage, such as the cloud storage system provided by EMC Corporation of Hopkinton, Mass. Such a system is disclosed, for example, in U.S. patent application no. 20090112789 (the '789 application), which is incorporated herein by reference. The '789 application provides a system where data objects are distributed among different servers that are possibly in different locations.

In some cases, it is desirable to provide replica data objects so that there are multiple instances of the same data on different servers. Any one of the instances may be provided in response to a read request or other type of request, such as a create or write request. A form of load balancing may be provided by selecting the instances randomly or, for example, in round robin fashion. However, doing this does not take into account any performance issues associated with any of the servers containing the instances. Thus, the system may attempt to access a particular instance on a particular server and, after the access request times out (takes too long to return a result), the system may mark the server/instance as unavailable and not attempt more accesses there until perhaps the situation is fixed.

While it is useful to mark non-performing servers as unavailable, it would be advantageous to be able to mark the server/instance as unavailable before attempting the access, thereby eliminating the time needed to wait for a timeout to occur.

SUMMARY OF THE INVENTION

According to the system described herein, servicing an access request using a plurality of replicas of data includes determining which of the replicas are available and selecting one of the replicas for servicing the access request based on which of the replicas are available, where at least one other replica is indicated as not available in response to receiving a monitoring message indicating that the at least one other replica is subject to degraded performance and where the monitoring messages are independent of the access request. The monitoring messages may be SNMP messages. Servicing an access request using a plurality of replicas of data may also include determining if each of the SNMP messages affects the availability of the replicas. The replicas may be selected in round robin fashion or randomly. Servicing an access request using a plurality of replicas of data may also include, in response to the selected replica not performing the access request, the replica is indicated as not available. Servicing an access request using a plurality of replicas of data may also include retrying an access operation.

According further to the system described herein, computer software, provided in a non-transitory computer-readable medium, services an access request using a plurality of replicas of data. The software includes executable code that determines which of the replicas are available and executable code that selects one of the replicas for servicing the access request based on which of the replicas are available, where at least one other replica is indicated as not available in response to receiving a monitoring message indicating that the at least one other replica is subject to degraded performance and where the monitoring messages are independent of the access request. The monitoring messages may be SNMP messages. The computer software may also include executable code that determines if each of the SNMP messages affect the availability of the replicas. The replicas may be selected in round robin fashion or randomly. The computer software may also include executable code that indicates that the replica is not available in response to the selected replica not performing the access request. The computer software may also include executable code that retries an access request.

According further to the system described herein, a data storage system includes a plurality of clients that access files and a plurality of interconnected servers, coupled to the clients, at least one of the servers determining which of a plurality of replicas are available for servicing an access request and selecting one of the replicas for servicing the access request based on which of the replicas are available, where at least one other replica is indicated as not available in response to receiving a monitoring message indicating that the at least one other replica is subject to degraded performance and where the monitoring messages are independent of the access request. The monitoring messages may be SNMP messages. The at least one of the servers may also determine if each of the SNMP messages affect the availability of the replicas. The replicas may be selected in round robin fashion or randomly. The at least one of the servers may indicate that the replica is not available in response to the selected replica not performing the access request.

BRIEF DESCRIPTION OF DRAWINGS

FIG. 7 is a diagram illustrating a layout storage object tree with multiple replication nodes for a file according to an embodiment of the system described herein.

FIG. 8 is a flow chart illustrating steps performed in connection with providing a replication node for accessing a file according to an embodiment of the system described herein.

DETAILED DESCRIPTION OF VARIOUS EMBODIMENTS

This application incorporates by reference published U.S. patent application 2009/0112921 (the '921 application) filed on Oct. 31, 2007 (pending).

Figure 1A:
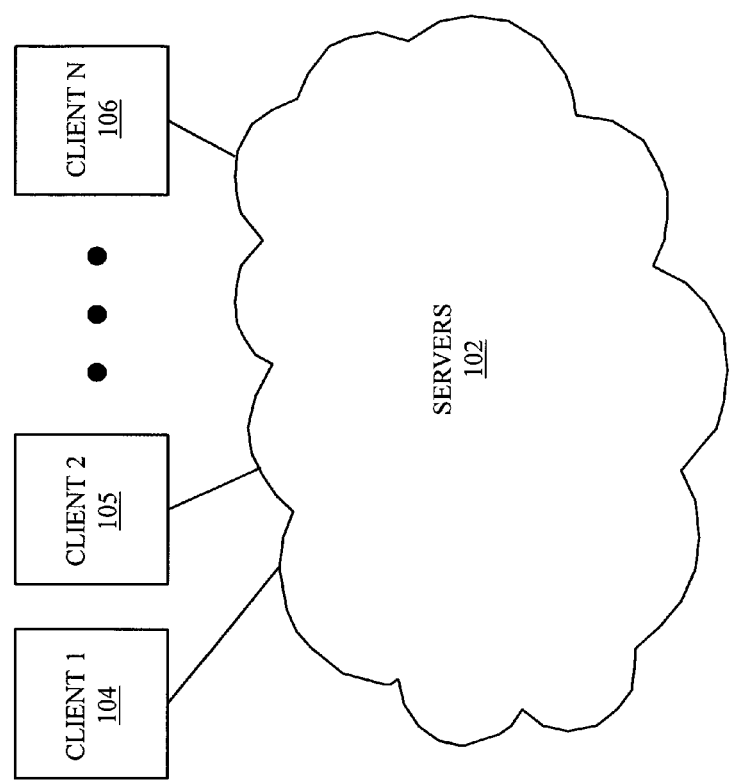
FIG. 1A is a diagram illustrating servers and clients according to an embodiment of the system described herein.

Referring to FIG. 1A, a diagram illustrates servers 102 coupled to a plurality of clients 104-106. Each of the clients 104-106 represents one or more processing devices that receives file services from the servers 102. Each of the clients 104-106 may or may not be independent of other ones of the clients 104-106. One or more of the clients 104-106 may be a multiprocessing/multiuser system and possibly have multiple independent users. The clients 104-106 represent any number of clients.

The file services provided by the servers 102 may include data storage and retrieval as well as related operations, such as data mirroring, cloning, etc. The servers 102 may be implemented using a plurality of services (and/or interconnected file servers including SAN components) that are provided by interconnected processing and/or storage devices. In an embodiment herein, each of the clients 104-106 may be coupled to the servers 102 using the Web, possibly in conjunction with local TCP/IP connections. However, it is possible for one or more of the clients 104-106 to be coupled to the servers 102 using any other appropriate communication mechanism and/or combinations thereof to provide the functionality described herein.

Figure 1B:
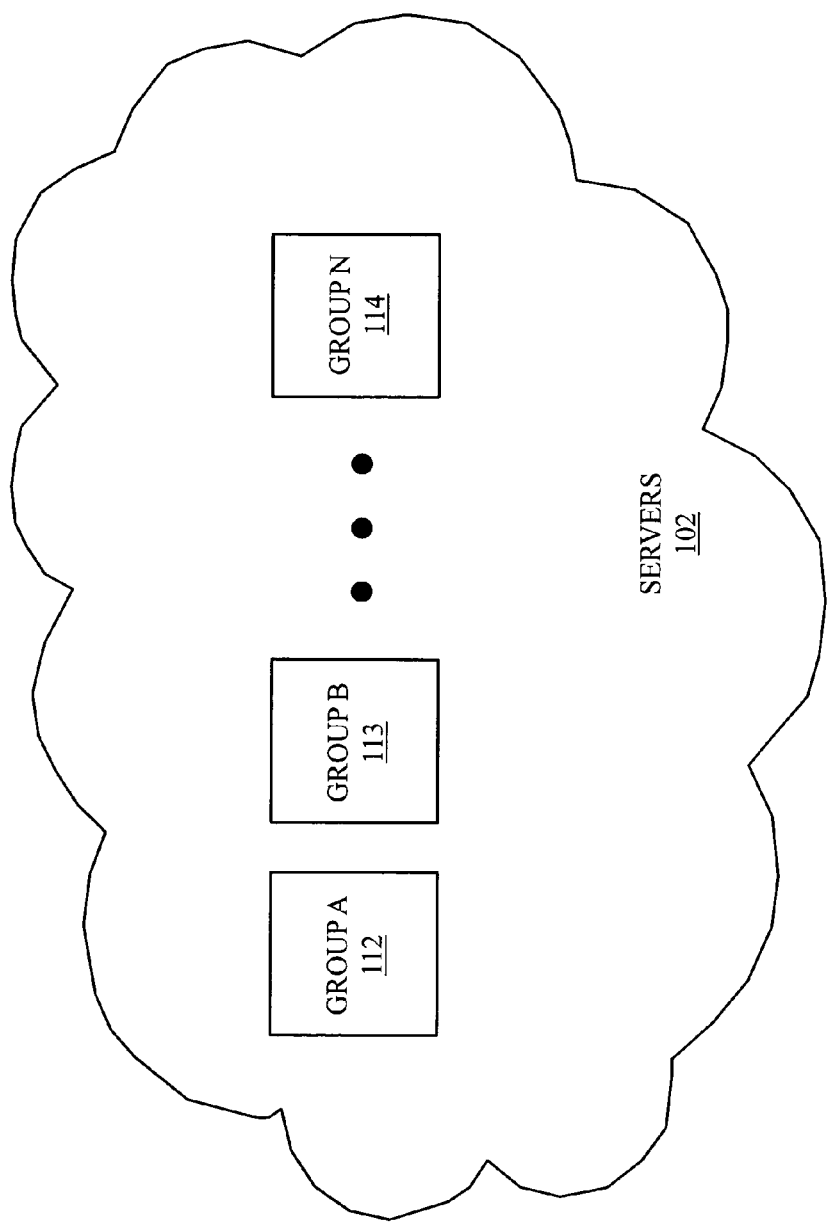
FIG. 1B is a diagram illustrating a plurality of servers according to an embodiment of the system described herein.

Referring to FIG. 1B, the servers 102 are shown in more detail as including a plurality of server groups 112-114, where each of the groups 112-114 may include one or more individual servers that may be managed together as a single data storage cloud. The terms "cloud", "data storage cloud", etc. should be generally understood herein as an integrated group of servers. Different ones of the groups 112-114 (clouds) may be managed separately from each other. As discussed in more detail elsewhere herein, the groups may be interconnected to transfer information using any appropriate means, including being interconnected through one or more of the clients 104-108, being interconnected through the Internet, a SAN, a private LAN or WAN, directly connected, and/or using any other appropriate interconnection to provide for information transfer as discussed elsewhere herein. For the discussion herein, one of the groups 112-114 may be a local cloud that is performing operations discussed herein while another one of the groups may be an external cloud that contains data accessed by the local cloud.

Figure 2B:
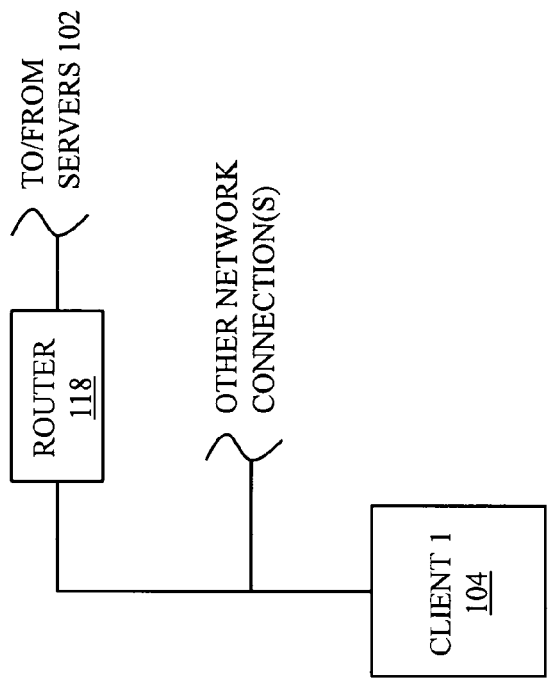
FIGS. 2A, 2B, 2C, and 2D are diagrams illustrating a client coupled to servers and to other network(s) according to embodiments of the system described herein.
Figure 2A:
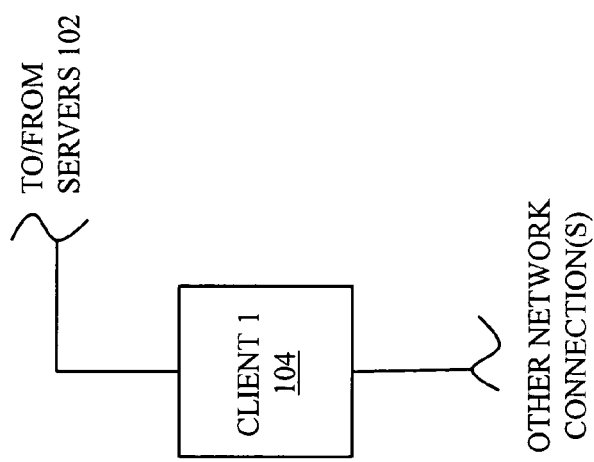

Referring to FIG. 2A, the client 104 is shown as being coupled to the servers 102 and to one or more other network(s). The other network(s) may include a local area network (LAN). Thus, the client 104 may be a gateway between the servers 102 and a LAN to which one or more other devices (not shown) may also be coupled. The client 104 may act as a local file server to the one or more other devices coupled to the LAN by providing data from the servers 102 to the one or more other devices. Of course, it is possible for one or more other clients to simultaneous act as gateways to the same or different other network(s). Generally, for the discussion herein, reference to a particular one of the clients 104-106 may be understood to include reference to any or all of the clients 104-106 coupled to the servers 102 unless otherwise indicated.

Referring to FIG. 2B, a diagram shows the client 104 being coupled to the servers 102 and one or more other network(s) (e.g., a LAN) in a configuration that is different from that shown in FIG. 2A. In the configuration of FIG. 2B, a router 118 is coupled between the servers 102 and the client 104. The router 118 may be any conventional router that may be accessed by the client 104. In the configuration of FIG. 2B, the client 104 uses only a single connection point to both the servers 102 and to the other network(s). In the configuration of FIG. 2B, the client 104 may act as local file server and gateway between the servers 102 and one or more other devices (not shown) coupled to the other network(s).

Figure 2D:
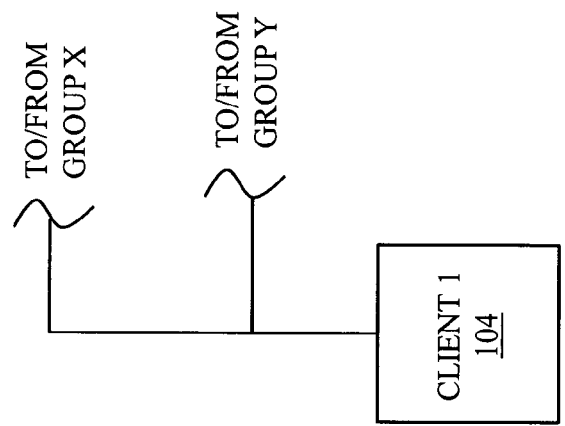
Figure 2C:
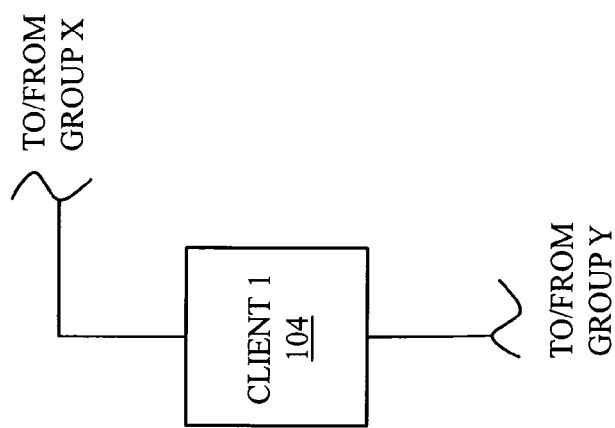

Referring to FIG. 2C, the client 104 as shown as being used to interconnect two server groups: Group X and Group Y. The connections to Group X and/or Group Y may or may not include a router, such as the router 118 shown in FIG. 2B and may or may not be direct or through other network configurations, as described elsewhere herein. In the embodiment of FIG. 2C, the client 104 may communicate with either the Group X servers and/or the Group Y servers, but communication from the Group X servers to the Group Y servers is through the client 104. One of Group X or Group Y may be a local cloud while the other is a foreign cloud.

Referring to FIG. 2D, the client 104 as shown as being connected to two server groups: Group X and Group Y. The connections to Group X and/or Group Y may or may not include a router, such as the router 118 shown in FIG. 2B and may or may not be direct or through other network configurations, as described elsewhere herein. In the embodiment of FIG. 2D, the client 104 may communicate with the Group X servers and/or the Group Y servers. However, unlike the embodiment of FIG. 2C, the Group X servers may communication with the Group Y servers without having to go through the client 104. Just as with FIG. 2C, one of Group X or Group Y may be a local cloud while the other is a foreign cloud.

Of course, any other appropriate connection configurations may be used by any of the client 104-106 coupled to the servers 102, the groups 112-114, and/or to any other network(s) and/or devices. In some embodiments, the clients 104-106 may access the metadata provided on one of the groups 112-114 and then may use the metadata to access data stored on another one of the groups 112-114. It is also possible for one of the groups 112-114 to access data from another one of the groups 112-114 by routing data requests through one of the clients 104-106. In such a case, the requests/data may pass through the client without any interpretation by the client.

Figure 3:
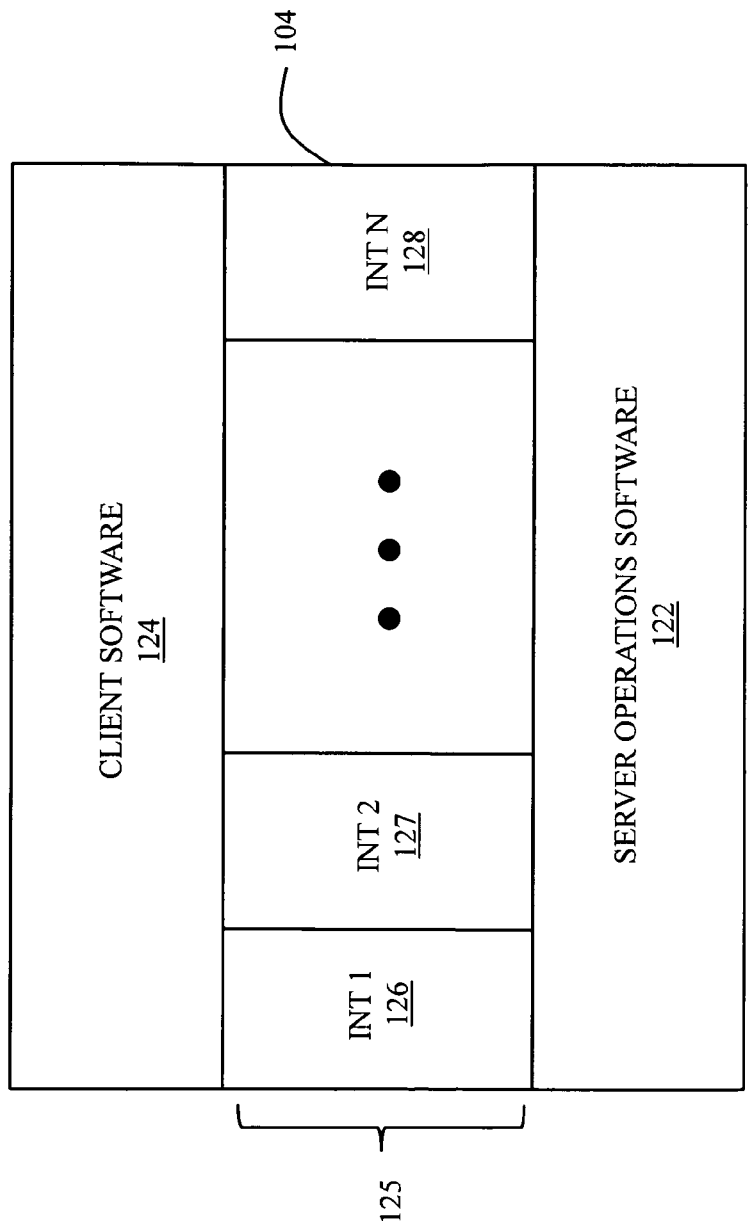
FIG. 3 is a diagram illustrating a client having server operations software, client software, and a plurality of interfaces therebetween according to an embodiment of the system described herein.

Referring to FIG. 3, the client 104 is shown in more detail having server operations software 122, client software 124, and an interface layer 125 that includes a plurality of interfaces 126-128 between the server operations software 122 and the client software 124. The server operations software 122 facilitates the exchange of information/data between the client 104 and the servers 102 to provide the functionality described herein. In some cases, the server operations software 122 may contain proxy servers (proxy services) for accessing external clouds. The server operations software 122 is described in more detail elsewhere herein.

The client software 124 represents any software that may be run on the client 104, including application software, operating system software, Web server software, etc., that is not part of the server operations software 122 or the interface layer 125. As described in more detail elsewhere herein, it is possible to have the client software 124 interact with the servers 102 through different ones of the interfaces 126-128 at the same time.

The file services described herein may be implemented by the servers 102 using a set of file objects (storage objects) where a data that is accessed by the client software includes a metadata file object which points to one or more data file objects that contain the data for the file. Accessing the file would involve first accessing the metadata file object to locate the corresponding data storage objects for the file. Doing this is described in more detail elsewhere herein. Note, however, that any appropriate storage object mechanism may be used for the system described herein. Also, in some embodiments, a metadata storage object may be provided on one of the groups of servers 112-114 (local cloud) while a corresponding one or more data storage objects are provided on another one of the groups of servers 112-114 (external cloud).

Figure 4:
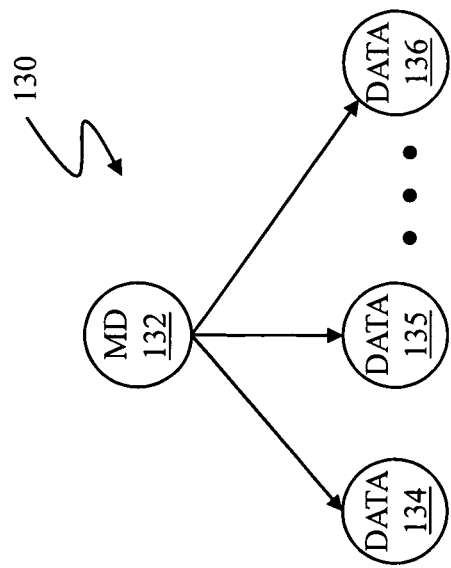
FIG. 4 is a diagram illustrating a file having a metadata file object and a plurality of data file objects according to an embodiment of the system described herein.

Referring to FIG. 4, a file 130 is shown as including a metadata file object 132 and a plurality of data file objects. The metadata file object 132 contains information that points to each of the data file objects 134-136. Accessing the file includes first accessing the metadata file object 132 and then using information therein to locate the appropriate one or more of the corresponding data file objects 134-136. As discussed elsewhere herein, in some cases, the metadata file object 132 may be provided on a different one of the groups of servers 112-114 (local cloud) than one or more of the corresponding data file objects 134-136 (external cloud).

Figure 5:
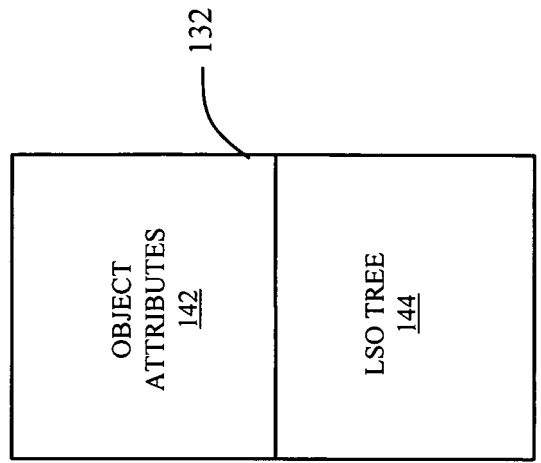
FIG. 5 is a diagram illustrating a metadata file object for a file according to an embodiment of the system described herein.

Referring to FIG. 5, the metadata file object 132 is shown in more detail as including an object attributes section 142 and a Layout Storage Object (LSO) tree section 144. The object attributes section contains conventional file-type attributes such as owner id, group id, access control list, last modification time, last access time, last change time, creation time, file size, and link count. Many of the attributes are self-explanatory. The last modification time corresponds to the last time that the data for the data objects 134-136 had been modified while the last change time corresponds to when the object metadata had last been changed. The link count indicates the number of other objects that reference a particular file (e.g., aliases that point to the same file). In an embodiment herein, a file and its related objects are deleted when the link count is decremented to zero.

The LSO tree section 144 includes a data structure that includes one or more maps for mapping the logical space of the file to particular data file objects. The LSO tree section 144 may also indicate any mirrors for the data and whether the mirrors are synchronous or asynchronous. LSO trees and mirrors are described in more detail elsewhere herein.

Figure 6C:
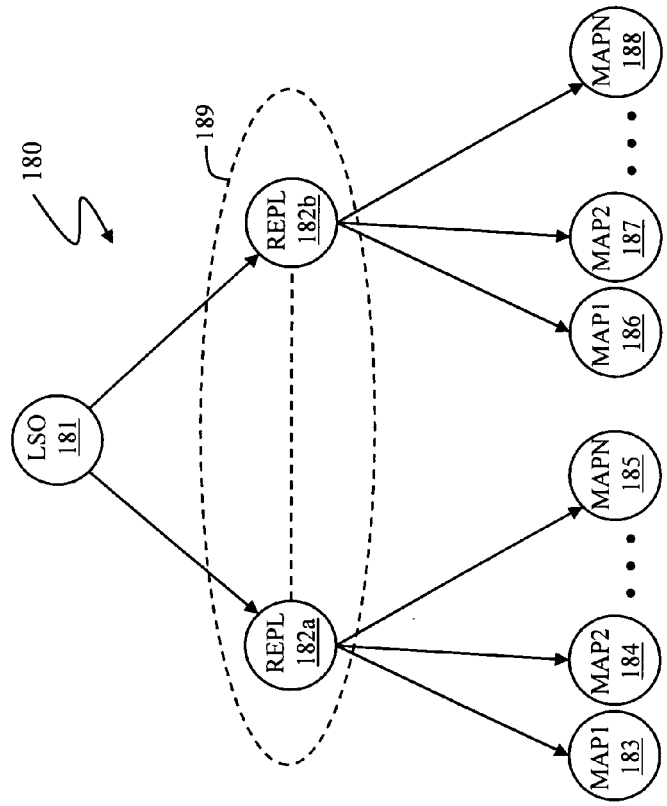
FIG. 6C is a diagram illustrating another example of a layout storage object tree with multiple maps and replication nodes for a file according to an embodiment of the system described herein.
Figure 6A:
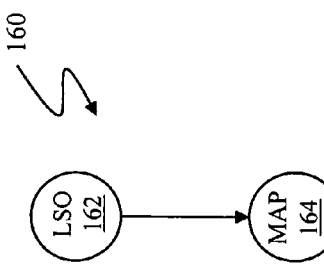
FIG. 6A is a diagram illustrating an example of a layout storage object tree for a file according to an embodiment of the system described herein.

Referring to FIG. 6A, a simple LSO tree 160 is shown as including an LSO root node 162 and a single map 164. The LSO root node 162 is used to identify the LSO tree 160 and includes links to one or more map(s) used in connection with the file corresponding to the LSO tree 160. The map 164 maps logical locations within the file to actual data storage location. A process that accesses logical storage space of a file represented by the LSO tree 160 first uses the LSO root node 162 to find the map 164 and then uses the map 164 to translate logical addresses within the file to an actual data storage locations. As discussed in more detail elsewhere herein, the map 164 may point to physical storage space in the same one of the server groups 112-114 that contains the physical storage space for the LSO tree 160. Alternatively, the map 164 may point to objects in storage space in a different one of the server groups 112-114 than the one of the server groups 112-114 that contains the physical storage space for the LSO tree 160.

Figure 6B:
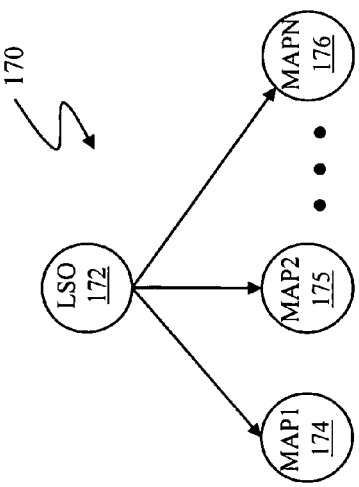
FIG. 6B is a diagram illustrating an example of a layout storage object tree with multiple maps for a file according to an embodiment of the system described herein.

Referring to FIG. 6B, an LSO tree 170 is shown as including an LSO root node 172 and a plurality of maps 174-176. Each of the maps 174-176 may represent a different range of logical offsets within the file corresponding to the LSO tree 170. For example, the map 174 may correspond to a first range of logical offsets in the file. The map 174 may map logical locations in the first range to a first actual storage device. The map 175 may correspond to a second range of logical offsets in the file, different than the first range, which may be mapped to a different actual storage device or may be mapped to the same actual storage device as the map 174. Similarly, the map 176 may correspond to a third range of logical offsets in the file, different than the first range and the second range, which may be mapped to a different actual storage device or may be mapped to the same actual storage device as the map 174 and/or the map 175. Note that some of the maps 174-176 may or may not point to physical storage space in the same one of the server groups 112-114 that contains the physical storage space for the LSO tree 170 while other ones of the maps 174-176 may or may not point to objects in physical storage space in a different one of the server groups 112-114 than the one of the server groups 112-114 that contains the physical storage space for the LSO tree 170.

Referring to FIG. 6C, an LSO tree 180 is shown as including an LSO root node 181 and a pair of replication nodes 182a, 182b, which indicate that the underlying data is to be mirrored (replicated) and which indicate whether the mirror is synchronous or asynchronous. The node 182a has a plurality of children maps 183-185 associated therewith while the node 182b has a plurality of children maps 186-188 associated therewith. The replication nodes 182a, 182b indicate that the data corresponding to the maps 183-185 is a mirror of data corresponding to the maps 186-188. In some embodiments, the nodes 182a, 182b may be implemented using a single node 189 to indicate replication.

A process accessing a file having the LSO tree 180 would traverse the tree 180 and determine that data is mirrored. As discussed in more detail elsewhere herein, depending upon the type of mirroring, the process accessing the LSO tree 180 would either write the data to the children of both of the nodes 182a, 182b or would provide a message to another process/server (e.g., the servers 102) that would perform the asynchronous mirroring.

Note that, just as with the maps 164, 174-176, discussed above, some of the maps 183-189 may or may not point to physical storage space in the same one of the server groups 112-114 that contains the physical storage space for the LSO tree 180 while other ones of the maps 183-189 may or may not point to objects in physical storage space in a different one of the server groups 112-114 than the one of the server groups 112-114 that contains the physical storage space for the LSO tree 180. Note also, however, that it may be advantageous in some instances to have the maps 183-185 for the replication node 182a point to objects on one of the server groups 112-114 while the maps 186-189 for the other replication node 182b point to physical objects on another one of the server groups 112-114.

In some embodiments, it may be beneficial to provide physical storage for all LSO trees on a first one of the server groups 112-114 (e.g. a local cloud) while providing physical storage for some or all of the corresponding data on a second, different, one of the server groups 112-114 (e.g., an external cloud). The first one of the server groups 112-114 may be a private cloud accessed by a particular organization while the second one of the server groups 112-114 is a public cloud that is accessed by many organizations, such as the Amazon S3 public cloud. Alternatively, the first one of the server groups 112-114 may be a public cloud while the second one of the server groups 112-114 is a private cloud or both the first and the second one of the server groups 112-114 could be public clouds or could be private clouds. The LSO trees may be provided on an external cloud. In addition, the data may be provided on separate clouds so that a first portion is provided on one cloud and a second (or subsequent) portion is provided on a second (or subsequent) cloud where each of the clouds that contain data are separate from each other.

The federation of a plurality of clouds allows the data to appear to a user (client) as if the data were provided on a single cloud. Note that since the LSO trees provide meaningful structure to the data, then maintaining the LSO trees in a private cloud provides some security even though some or all of the corresponding data may be provided in a public cloud. Note also that the physical storage space required for the LSO trees is expected to be much less than that required for the corresponding data. Accordingly, in instances where the LSO trees are provided in a private cloud while the corresponding data is provided in a public cloud, the physical storage space that needs to be maintained for the private cloud is much less than it would be otherwise while sensitive metadata may be maintained securely in the private cloud.

Referring to FIG. 7, an LSO tree 200 includes a root node 202 and a plurality of replicas 204-206. Each of the replicas 204-206 represents a mirror of particular data. As discussed elsewhere herein, and in the '921 application, different ones of the replicas 204-206 may be provided on different servers. Different ones of the replicas 204-206 may also be provided in different clouds. Any of the replicas 204-206 may be used to service an access request (e.g., read, create, write, etc.) for the corresponding data since the replicas are provided to be identical. The three replicas 204-206 shown in FIG. 7 represent any number of replicas that may exist.

Referring to FIG. 8, a flow chart 220 illustrates steps performed in connection with servicing an access request for data corresponding to the replicas 204-206. The mechanism used in FIG. 8 is round robin, although any other appropriate selection mechanism may be used, including random selection and/or selecting based on a general policy such as creating a replica based on "green" criteria.

Processing begins at a step 222 where a pointer, used to iterate through the replicas, is initialized (e.g., points to the first one of replicas 204-206 in a list thereof). Following the step 222 is a test step 224 where it is determined if there is an outstanding request to access data. If not, control loops back to the step 224 to test again. The step 224 essentially represents polling to wait for an outstanding request to access data. The system could also wait at the step 224 for occurrence of an interrupt/exception routine corresponding to a request for data.

If a request for data is provided (i.e., by a calling process to access data), then control transfers from the step 224 to a test step 226 where it is determined if the particular replica indicated by the iteration pointer is unavailable. As discussed elsewhere herein, a replica may be indicated as unavailable for different reasons, such as degraded performance. Of course, receipt of a monitoring message, such as an SNMP message, may cause a node (and/or group of nodes) to be marked as unavailable. As discussed elsewhere herein, marking nodes as unavailable using monitoring message information advantageously avoids the necessity to first attempt to access a node in order to be able to mark the node as unavailable.

If it is determined at the test step 226 that the replica is available, then control transfers from the test step 226 to a step 228 where the replica indicated by the iteration pointer is returned to the calling process. Following the step 228 is a step 232 where the iteration pointer is incremented. Note that the step 232 is also reached from the step 226 if it is determined at the step 226 that the replica indicated by the iteration pointer is unavailable.

Following the step 232 is a test step 234 where it is determined if the pointer used to iterate through the replicas is past the end of a list of replicas (i.e., needs to be reset to wrap). If not, then control passes from the step 234 back to the step 224 for another iteration to service outstanding requests. Note, by the way, that the present request may still be outstanding if the replica was not available at the step 226. If it is determined at the test step 234 that the iteration pointer is past the end of a list of replicas, then control passes from the test step 234 back to the step 222, discussed above, to reinitialize the iteration pointer.

Figures 9, 10:
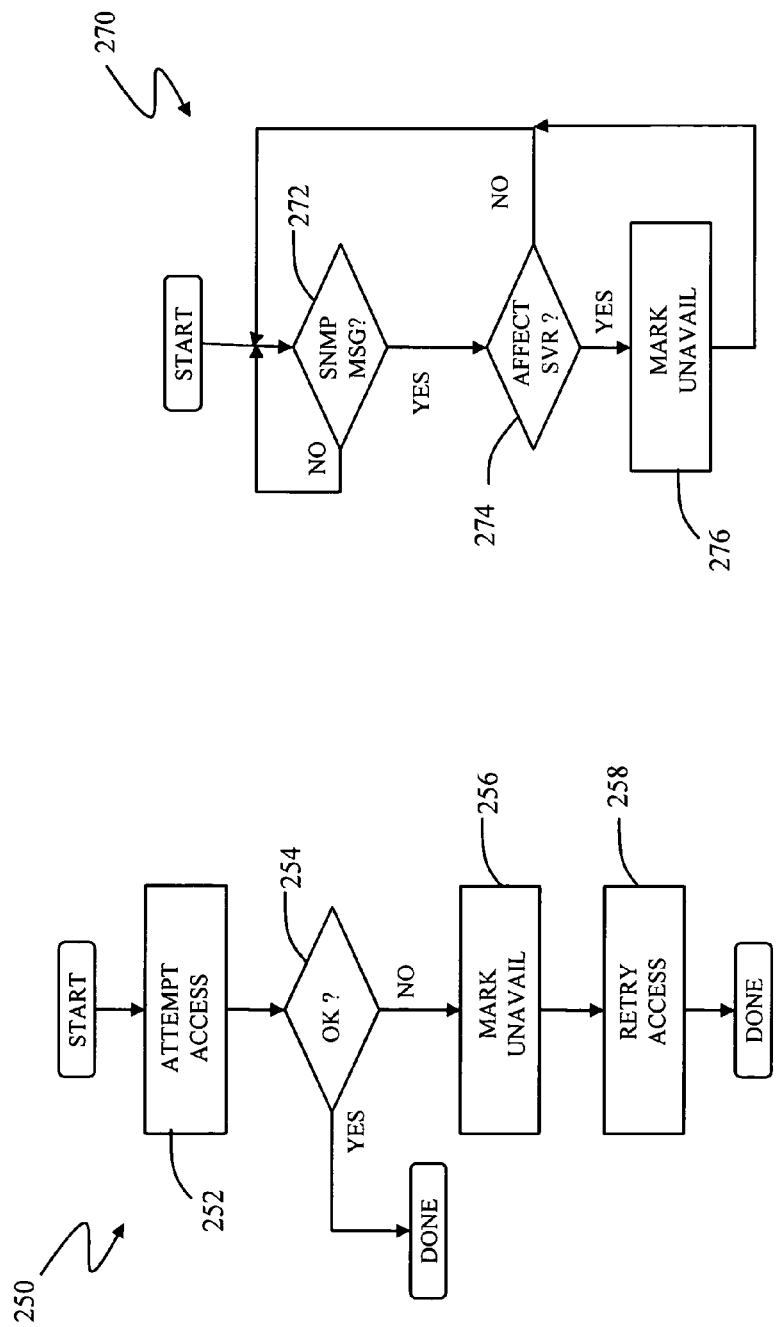
FIG. 9 is a flow chart illustrating steps performed in connection with setting a replication node for a file as unavailable for accessing in response to performance issues according to an embodiment of the system described herein.
FIG. 10 is a flow chart illustrating steps performed in connection with setting a replication node for a file as unavailable for accessing in response to a monitoring message according to an embodiment of the system described herein.

Referring to FIG. 9, a flow chart 250 illustrates steps performed in connection with accessing a replica, such as the replica returned at the step 228 in the flow chart 220, discussed above. Processing begins at a first step 252 where the access operation (e.g., read, write, create, etc.) is attempted. In an embodiment herein, the processing illustrated by the flow chart 250 is only performed for nodes that are otherwise available (e.g., based on the test step 226 of the flow chart 220, discussed above). In other embodiments, it may be possible to perform the processing illustrated by the flow chart 250 for all nodes, it which case it may be useful to perform an initial test for availability (like the test at the step 226, described above) prior to performing the first step 252.

Following the step 252 is a test step 254 where it is determined if the result of the access operation at the step 252 was successful (i.e., if the access operation was performed). If so, then processing is complete. Otherwise, control transfers from the test step 254 to a step 256 where the replica is marked unavailable so that future attempts to access the data will skip the particular replica. Note that other processing may be performed at a later time to address the issues that caused the difficulty and, perhaps, to make the replica available again. Note also that the test at the step 254 is separate and independent from the test at the step 226, discussed above. Generally, the test at the step 226 may be based on monitoring messages whereas the test at the step 254 is based on a failed access attempt. The test at the step 226 is meant to mark nodes as unavailable without having to first perform the access attempt illustrated by the flow chart 250. Ideally, as many nodes as possible would be marked as unavailable based on the test step 226 so as to avoid failed access attempts illustrated by the steps 254, 256.

Following the step 256 is a step 258 where the access operation is retried. Retrying the access operation may include providing an access request for the data and then performing the processing illustrated in the flow chart 220, discussed above. Note that, until it is fixed, the replica on which the access attempt was performed will not be available at the step 226, discussed above. Thus, retrying the access at the step 258 will not retry using the same replica that failed at the step 252. Following the step 258, processing is complete.

Although it is useful to make non-performing replicas (and/or associated servers) unavailable as illustrated in the flow chart 250, discussed above, it is desirable to be able to do so without having to first experience non-performance. This may be especially true in instances where the non-performance is in the form of a timeout, since waiting for a timeout delays processing.

Referring to FIG. 10, a flow chart 270 illustrates processing performed in connection with using system monitoring mechanisms to mark replicas (and/or associated servers) as unavailable. The processing may be performed concurrently with any other operations being performed (e.g., concurrent with replica reads/writes) and thus a replica may be marked as unavailable by the processing illustrated in the flow chart 270 independently of, and prior to, attempting to access data from the replica.

Processing begins at a test step 272 where it is determined if an SNMP message has been received. SNMP is a UDP-based network protocol that is used in network management systems to monitor network-attached devices for conditions that warrant administrative attention. SNMP exposes management data in the form of variables on the managed systems, which describe the system configuration. These variables can then be queried (and sometimes set) by managing applications.

The advantage of using SNMP is that nearly all servers and other network components are deployed with SNMP capabilities. In many instances, the SNMP data is used by network management systems to provide a display to a human operator that can address any trouble. For example, a server that is experiencing performance degradation can send SNMP messages that are received by a program that displays a message to an IT operator. The IT operator can then physically examine the server and/or possibly run additional tests.

It is determined at the test step 272 if an SNMP message has been received. If not, control loops back to the step 272 to test again. The step 272 essentially represents polling to wait for an SNMP message to be issued. The system could also wait at the step 272 for occurrence of an interrupt/exception routine corresponding to issuance of an SNMP message.

If it is determined at the step 272 than an SNMP message has been received, then control transfers from the test step 272 to a test step 274 where it is determined if the SNMP message affects a server/replica. Note that there are many types of SNMP messages, only some of which may be of interest. For example, there may be SNMP messages that periodically broadcast system status and thus, if everything is working, such messages will not affect replica/server availability. Note also that there may be SNMP messages for components/ servers that do not contain any replicas. The SNMP messages of interest at the step 274 indicate that the server/replica in question is subject to degraded performance. Note that the SNMP message about the server/replica may be received without having to actually access from the server/replica. Thus, the system may indicate a particular server/replica is unavailable without having to experience the delay associated with attempting to access a degraded component.

If it is determined at the test step 274 that the received SNMP message is not related to service/performance of any replicas, then control transfers from the test step 274 back to the step 272 for another iteration. Otherwise, control transfers from the test step 274 to a step 276 where the appropriate replica/server is indicated as unavailable. Following the step 276, control transfers back to the step 272 for another iteration.

Note that the system described herein may use a monitoring protocol other than SNMP. Note also that references to replicas may be understood to include servers and/or groups of servers that include the replicas. Thus, for example, if it is determined that a particular server or group of servers is not performing (based on SNMP or other monitoring messages), it may be possible to indicate that all replicas stored on the server or group of servers are unavailable.

The system described herein may be used with any server, or any group of servers, capable of providing the functionality described herein. The particular form of the file objects may vary without departing from the spirit and scope of the invention. In some instances, the order of steps in the flow charts may be modified, where appropriate. The system described herein may be implemented using a computer program product/software provided in a computer-readable storage medium (e.g., a fixed computer-readable storage medium) and executed on one or more processors.

While the invention has been disclosed in connection with various embodiments, modifications thereon will be readily apparent to those skilled in the art. Accordingly, the spirit and scope of the invention is set forth in the following claims.

What is claimed is:

1. A method of servicing an access request using a plurality of replicas of data, the method comprising:
    determining which of the replicas are available, wherein each of the replicas is included in a list of replicas, and wherein availability of each of the replicas is determined by a controller from the list of replicas, wherein the plurality of replicas include multiple instances of same data on different servers; and
    selecting one of the replicas for servicing the access request based on which of the replicas are determined as available by the controller using the list of replicas, wherein at least one other replica on the list of replicas is indicated as not available in response to receiving a particular monitoring message from the at least one other replica indicating that the at least one other replica is subject to degraded performance, and wherein monitoring messages received from the plurality of replicas are independent of the access request, wherein each of the monitoring messages is initiated by a corresponding one of the plurality of replicas, and wherein the at least one other replica is indicated in the list of replicas as unavailable based on receipt of the particular monitoring message from the at least one other replica independent of the controller performing an attempt to access or transmit a communication to the at least one other replica.

2. A method, according to claim 1, wherein the monitoring messages are SNMP messages.

3. A method, according to claim 2, further comprising:
   determining if each of the SNMP messages affect the availability of the replicas.

4. A method, according to claim 1, wherein the replicas are selected in round robin fashion.

5. A method, according to claim 1, wherein the replicas are selected randomly.

6. A method, according to claim 1, further comprising:
   in response to the selected replica not performing the access request, the replica is indicated as not available.

7. A method, according to claim 6, further comprising:
   retrying an access operation.

8. A non-transitory computer-readable medium storing computer software that, when executed by one or more processors of a computer system, causes the computer system to implement a method that services an access request using a plurality of replicas of data, the method comprising:
   determining which of the replicas are available, wherein each of the replicas is included in a list of replicas, and wherein availability of each of the replicas is determined, by a controller, from the list of replicas, wherein the plurality of replicas include multiple instances of same data on different servers; and
   selecting one of the replicas for servicing the access request based on which of the replicas are determined as available by the controller using the list of replicas, wherein at least one other replica on the list of replicas is indicated as not available in response to receiving a particular monitoring message from the at least one other replica indicating that the at least one other replica is subject to degraded performance, and wherein monitoring messages received from the plurality of replicas are independent of the access request, wherein each of the monitoring messages is initiated by a corresponding one of the plurality of replicas, and wherein the at least one other replica is indicated in the list of replicas as unavailable based on receipt of the particular monitoring message from the at least one other replica independent of the controller performing an attempt to access or transmit a communication to the at least one other replica.

9. A non-transitory computer-readable medium, according to claim 8, wherein the monitoring messages are SNMP messages.

10. A non-transitory computer-readable medium, according to claim 9, the method further comprising:
    determining if each of the SNMP messages affect the availability of the replicas.

11. A non-transitory computer-readable medium, according to claim 9, the method further comprising:
    indicating that the replica is not available in response to the selected replica not performing the access request.

12. A non-transitory computer-readable medium, according to claim 9, the method further comprising:
    retrying an access operation.

13. A non-transitory computer-readable medium, according to claim 8, wherein the replicas are selected in round robin fashion.

14. A non-transitory computer-readable medium, according to claim 8, wherein the replicas are selected randomly.

15. A data storage system, comprising:
    a plurality of clients, each having at least one hardware processor, that access files; and
    a plurality of interconnected servers, each having at least one hardware processor and being coupled to the clients, at least one of the servers performing the following processing:
       determining which of a plurality of replicas are available for servicing an access request, wherein each of the replicas is included in a list of replicas, and wherein availability of each of the replicas is determined, by the at least one server, from the list of replicas, wherein the plurality of replicas include multiple instances of same data on different servers, and
       selecting one of the replicas for servicing the access request based on which of the replicas on the list of replicas are available, wherein at least one other replica on the list of replicas is indicated as not available in response to receiving a particular monitoring message from the at least one other replica indicating that the at least one other replica is subject to degraded performance, and wherein monitoring messages received from one or more of the plurality of replicas are independent of the access request, wherein each of the monitoring messages is initiated by a corresponding one of the plurality of replicas, and wherein the at least one other replica is indicated in the list of replicas as unavailable based on receipt of the particular monitoring message from the at least one other replica independent of the controller performing an attempt to access or transmit a communication to the at least one other replica.

16. A data storage system, according to claim 15, wherein the monitoring messages are SNMP messages.

17. A data storage system, according to claim 16, wherein the at least one of the servers also determines if each of the SNMP messages affect the availability of the replicas.

18. A data storage system, according to claim 15, wherein the replicas are selected in round robin fashion.

19. A data storage system, according to claim 15, wherein the replicas are selected randomly.

20. A data storage system, according to claim 15, wherein the at least one of the servers indicates that the replica is not available in response to the selected replica not performing the access request.

* * * * *